US009105138B2

(12) United States Patent
Kitagawa et al.

(10) Patent No.: US 9,105,138 B2
(45) Date of Patent: Aug. 11, 2015

(54) VEHICLE BEHAVIOR DATA STORAGE CONTROL SYSTEM AND ELECTRONIC CONTROL UNIT

(75) Inventors: Tomohiro Kitagawa, Kariya (JP); Masayoshi Kondoh, Chiryu (JP)

(73) Assignee: DENSO CORPORATION, Kariya (JP)

( * ) Notice: Subject to any disclaimer, the term of this patent is extended or adjusted under 35 U.S.C. 154(b) by 529 days.

(21) Appl. No.: 13/353,592

(22) Filed: Jan. 19, 2012

(65) Prior Publication Data

US 2012/0185125 A1 Jul. 19, 2012

(30) Foreign Application Priority Data

Jan. 19, 2011 (JP) .................................... 2011-8766

(51) Int. Cl.

| | |
|---|---|
| ***G06F 11/30*** | (2006.01) |
| ***G07C 5/00*** | (2006.01) |
| ***G01M 17/00*** | (2006.01) |
| ***G06F 7/00*** | (2006.01) |
| ***G06F 19/00*** | (2011.01) |
| ***G07C 5/08*** | (2006.01) |

(52) U.S. Cl.
CPC ...................................... *G07C 5/085* (2013.01)

(58) Field of Classification Search
CPC ........... G06F 7/00; G06F 7/02; G07C 5/0808; G07C 5/0816; G07C 5/0841; G07C 5/085; F02D 41/22
USPC ..................... 701/31.7, 32.7, 33.4, 34.3, 29.2
See application file for complete search history.

(56) References Cited

U.S. PATENT DOCUMENTS

| | | | | |
|---|---|---|---|---|
| 5,754,965 | A | 5/1998 | Hagenbuch | |
| 2008/0255721 | A1 | 10/2008 | Yamada | |
| 2009/0037044 | A1 | 2/2009 | Enomoto et al. | |
| 2010/0100278 | A1 | 4/2010 | Saito | |
| 2011/0190978 | A1 * | 8/2011 | Mao et al. | 701/35 |
| 2012/0166039 | A1 * | 6/2012 | Kitagawa et al. | 701/32.7 |
| 2012/0253586 | A1 * | 10/2012 | Sakakibara | 701/29.2 |

FOREIGN PATENT DOCUMENTS

| | | |
|---|---|---|
| JP | 2009-205368 | 9/2009 |

* cited by examiner

*Primary Examiner* — Dalena Tran
*Assistant Examiner* — Jaime Figueroa
(74) *Attorney, Agent, or Firm* — Nixon & Vanderhye P.C.

(57) ABSTRACT

A vehicle behavior data storage control system including a storage control device and an ECU is disclosed. Upon determining occurrence of an unexpected behavior, the storage control device stores an unexpected behavior data in a memory and transmits the unexpected behavior data. The ECU determines whether or not the unexpected behavior data matches an estimated behavior data indicative of a behavior estimated to occur due to control processing of the ECU. When both data match each other, the ECU transmits the matching information. The storage control device, upon receipt of the matching information, deletes or permits overwriting the unexpected behavior data stored in the memory.

22 Claims, 10 Drawing Sheets

VEHICLE BEHAVIOR DATA STORAGE CONTROL SYSTEM AND ELECTRONIC CONTROL UNIT

CROSS REFERENCE TO RELATED APPLICATION

The present application is based on and claims priority to Japanese Patent Application No. 2011-8766 filed on Jan. 19, 2011, disclosure of which is incorporated herein by reference.

TECHNICAL FIELD

The present disclosure relates to a vehicle behavior data storage control system and an electronic control unit, which can efficiently record a necessary behavior data.

BACKGROUND

There is a storage control device which records a behavior data in a memory in response to detection of an abnormal vehicle behavior. The behavior data indicates a vehicle behavior at a time of the detection and may include vehicle information and control information. The behavior data is used in subsequent analysis (see JP-A-2009-205368, for example).

In this relation, the inventors of the present application have found the following. A system may be configured such that, when a behavior data satisfies a predetermined condition, the storage control device alone determines occurrence of an abnormal behavior. In this configuration, even when the behavior data causing the determination of the abnormal behavior is attributed to normal control that is performed by another ECU based on a driver's order, the behavior data indicating the abnormal behavior is stored in the memory.

For example, let us consider the following situation. A condition for the storage control device to determine an abnormal behavior is set to an acceleration that is greater than or equal to a predetermined threshold. Additionally, a switch for activating cruise control is turned on by a vehicle driver. In this case, the storage control device may determine that an abnormal behavior has occurred, even though a throttle control ECU other than the storage control device has controlled a throttle to generate a driver expected acceleration. When this kind data of driver expected normal behavior, which occurs as expected by the driver, is recorded, the data of driver expected behavior (also called herein a normal behavior) may be mixed with the data of a driver unexpected behavior (also called herein an abnormal behavior) that should be recorded. Therefore, there is a possibility that it becomes impossible to adequately analyze a cause of an unexpected behavior in a later analysis.

SUMMARY

In view of the foregoing, it is an objective of the present disclosure to provide a vehicle behavior data storage control system and an electronic control unit that can improve determination accuracy as to whether or not a vehicle behavior is an unexpected behavior to be stored.

According to a first example of the present disclosure, a vehicle behavior data storage control system is provided. The vehicle behavior data storage control system comprises a storage control device and an electronic control unit (ECU) that controls a predetermined control target and is connected to the storage control device via an in-vehicle network to enable data exchange with the storage control device. The storage control device includes a behavior determination section and a memory section. The behavior determination section acquires behavior data and determines whether or not an unexpected behavior has occurred based on the acquired behavior data. The memory section is provided to store the behavior data associated with the unexpected behavior as an unexpected behavior data. The storage control device further includes a first storage control section that records in the memory section the behavior data at a time when the behavior determination section determines that the unexpected behavior has occurred, so that the behavior data associated with the unexpected behavior is stored as the unexpected behavior data in the memory section. The storage control device further includes an unexpected behavior data transmission section that transmits the unexpected behavior data to the in-vehicle network. The ECU includes a behavior data comparison determination section that (i) calculates an estimated behavior data indicative of an estimated behavior, which is a behavior estimated to occur due to control processing performed by the ECU, and (ii) determines whether or not content of the unexpected behavior data, which is transmitted from the storage control device to the in-vehicle network, matches that of the estimated behavior data. When the content of the unexpected behavior data matches that of the estimated behavior data, the behavior data comparison determination section determines that occurrence of the unexpected behavior is attributed to the control processing performed by the ECU. The ECU further includes a matching information transmission section that transmits matching information to the in-vehicle network when the behavior data comparison determination section determines that the content of the unexpected behavior data matches that of the estimated behavior data. The storage control device further includes a second storage control section that, upon receipt of the matching information, deletes or permits overwriting the unexpected behavior data stored in the memory section.

According to a second example of the present disclosure, a vehicle behavior data storage control system comprising a storage control device and an electronic control unit (ECU) is provided. The storage control device includes a behavior determination section, a first memory and a second memory. The behavior determination section acquires behavior data and determines whether or not an unexpected behavior has occurred based on the acquired behavior data. Each of the first memory and the second memory is provided to store the behavior data associated with the unexpected behavior as an unexpected behavior data. The electronic control unit (ECU) controls a predetermined control target and is connected to the storage control device via an in-vehicle network to enable data exchange with the storage control device. The storage control device further includes a first storage control section that records in the first memory the behavior data at a time when the behavior determination section determines that the unexpected behavior has occurred, so that the behavior data associated with the unexpected behavior is stored as the unexpected behavior data in the first memory. The storage control device further includes an unexpected behavior data transmission section that transmits the unexpected behavior data to the in-vehicle network. The ECU includes a behavior data comparison determination section that (i) calculates an estimated behavior data indicative of an estimated behavior, which is a behavior estimated to occur due to control processing performed by the ECU, and (ii) determines whether or not content of the unexpected behavior data, which is transmitted from the storage control device to the in-vehicle network, matches that of the estimated behavior data. When the content of the unexpected behavior data matches that of the estimated behavior data, the behavior data comparison determination section determines that occurrence of the unexpected behavior is attributed to the control processing performed by the ECU. The ECU further includes a matching information transmission section that transmits matching information to the in-vehicle network when the behavior data comparison determination section determines that the content of the unexpected behavior data matches that of the estimated behavior data. The storage control device further includes a second storage control section that, upon receipt of the matching information, records in the second memory the unexpected behavior data that was recorded in the first memory by the first storage control section.

According to a third example of the present disclosure, a subject electronic control unit connected with a network is provided. To the network, a storage device is also connected. The storage device acquires behavior data indicative of actual vehicle behavior and determines based on the acquired behavior data whether or not an unexpected behavior has occurred. Upon determining that the unexpected behavior has occurred, the storage device records the behavior data as the unexpected behavior data and transmits the unexpected behavior data to the network. To network, a plurality of electronic control units is connected in addition to the subject electronic control unit. The subject electronic control unit comprises a microcomputer that performs control processing having an influence on the vehicle behavior, calculates an estimated behavior data indicative of an estimated future behavior based on a control amount of the control processing performed by the subject electronic control unit, and outputs matching information when a difference between the estimated behavior data and the unexpected behavior data transmitted from the storage device to the network is less than or equal to a predetermined value. The matching information indicates that the unexpected behavior data is attributed to the control processing of the subject electronic control unit.

According to the above vehicle behavior data storage control system and the subject electronic control unit, it is possible to improve determination accuracy as to whether or not a vehicle behavior is an unexpected behavior to be stored.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
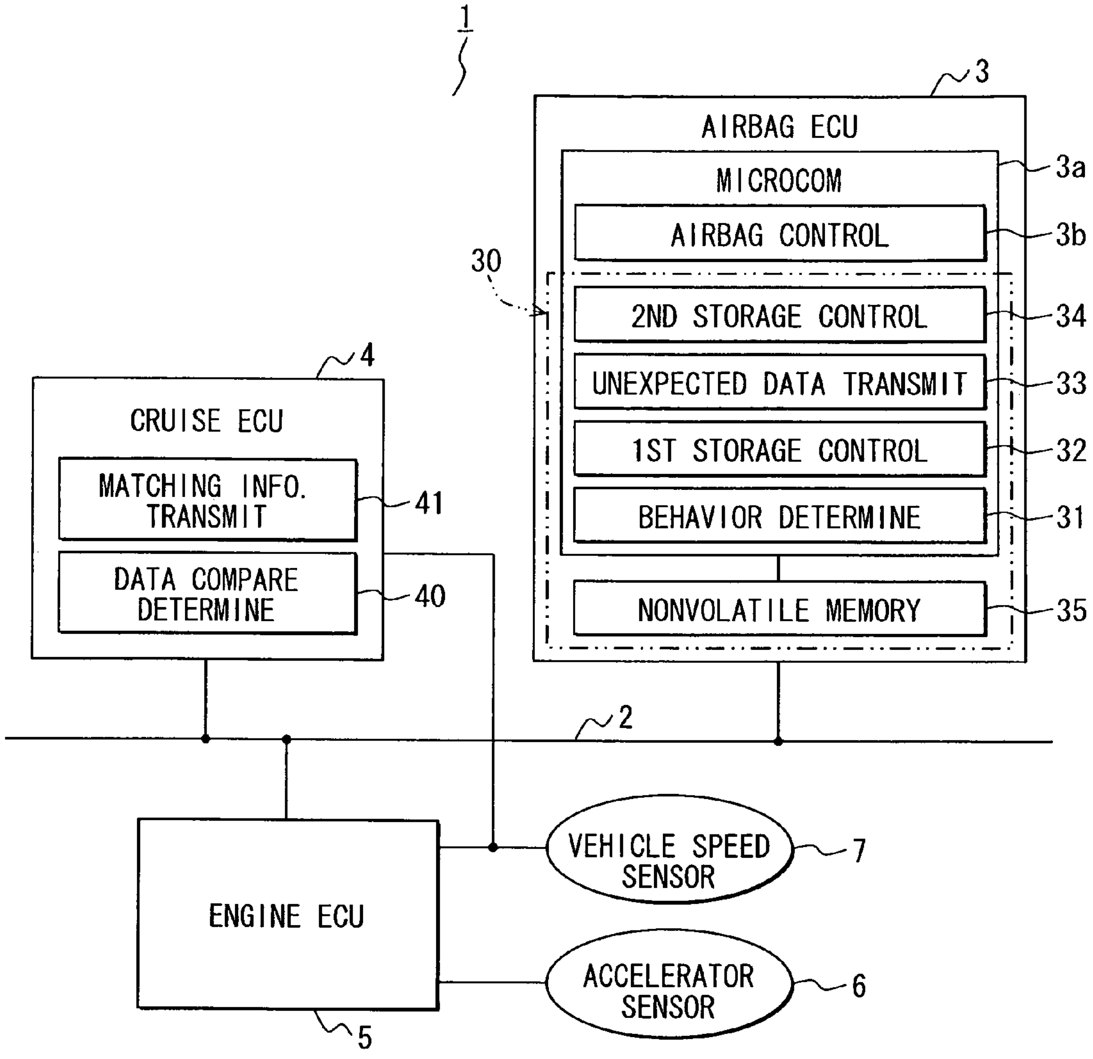
FIG. 1 is a functional block diagram of a vehicle behavior data storage control system according to a first embodiment.

A first embodiment will be described with reference to FIGS. 1 to 4. In the first embodiment, a vehicle behavior data storage control system 1 is connected with electronic control units (ECUs) such as an airbag ECU 3, a cruise ECU 4, and an engine ECU 5 via a controller area network (CAN) 2 acting as an in-vehicle network.

The airbag ECU 3 includes a microcomputer 3*a* provided with a CPU, ROM, and RAM (none shown). The microcomputer 3*a* has an airbag control section 3*b*, which can act as a known airbag control means and which controls an ignition device (control target) for inflating an airbag upon detection of a vehicle collision.

The microcomputer 3*a* includes or acts as a storage control device 30. The storage control device 30 includes a behavior determination section 31 acting as a behavior determination means, a first storage control section 32 acting as a first storage control means, and an unexpected behavior data transmission section 33 acting as an unexpected behavior data transmission means, and a second storage control section 34 acting as a second storage control means. The storage control device 30 further includes a nonvolatile memory 35 connected with the microcomputer 3*a*. The nonvolatile memory 35 acts as a memory section or means. The nonvolatile memory 35 includes a rewritable flash memory. An example of the unexpected behavior referred to herein is acceleration of the vehicle in a state where the driver is not operating the accelerator pedal. That is, the unexpected behavior referred to herein is, for example, a behavior that is unexpected to the driver. The unexpected behavior data refers to vehicle information at a time when it is determined that the unexpected behavior has occurred. The vehicle information includes information inputted to the ECU, such as a detection value of each sensor, or a value calculated based on the detection value of each sensor, and the like.

From an engine ECU 5 via the CAN 2, the airbag ECU 3 receives sensor signals detected by an accelerator position sensor 6 and a vehicle speed sensor 7. The cruise ECU 4 includes a microcomputer (not shown) provided with a CPU, a ROM, and a RAM. When a control start switch (not shown) is turned on, the cruise ECU 4 starts cruise control. In the cruise control, the cruise ECU 4 performs computation necessary for the control based on, for example, sensor signal from the vehicle speed sensor 7. Additionally, in order to perform constant speed travel control or acceleration/deceleration control, the cruise ECU 4 issues a request command to the engine ECU 5, which is an example of a control target of the cruise ECU 4. The cruise ECU 4 includes or functions as a behavior data comparison determination section 40 acting as a behavior data comparison determination means and a matching information transmission section 41 acting as a matching information transmission means.

Only when the cruise ECU 4 is in an operating state where the cruise ECU 4 controls a control target, i.e., only when the cruise ECU 4 performs the cruise control, the cruise ECU accepts reception of the unexpected behavior data from the storage control device 30. The engine ECU 5 adjusts, based on the request command received from each ECU, the opening of a throttle valve (actuator), which is an example of a control target, according to sensor signals from the accelerator position sensor 6 and the vehicle speed sensor 7. The cruise ECU 4 also controls a transmission and a brake system (neither shown).

Figure 2:
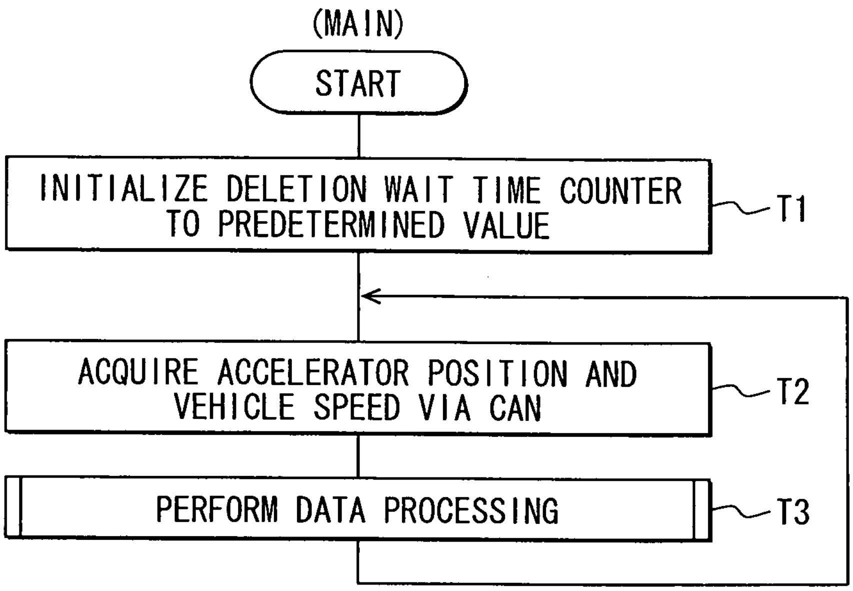
FIG. 2 is a flowchart of control performed by a storage control device.

The airbag ECU 3 (which includes the storage control device 30), the cruise ECU 4 and the engine ECU 5 have common time information. The storage control device 30 of the airbag ECU 3 performs storage control shown in FIGS. 2 and 3. FIG. 2 shows a main routine of the storage control. First, in step T1, a deletion wait time counter is initialized to a predetermined time of, for example, 3 seconds. Next, in step T2, sensor signals are acquired from the accelerator position sensor 6 and vehicle speed sensor 7 via the CAN 2. In step 3, the data processing is processed.

Figure 3:
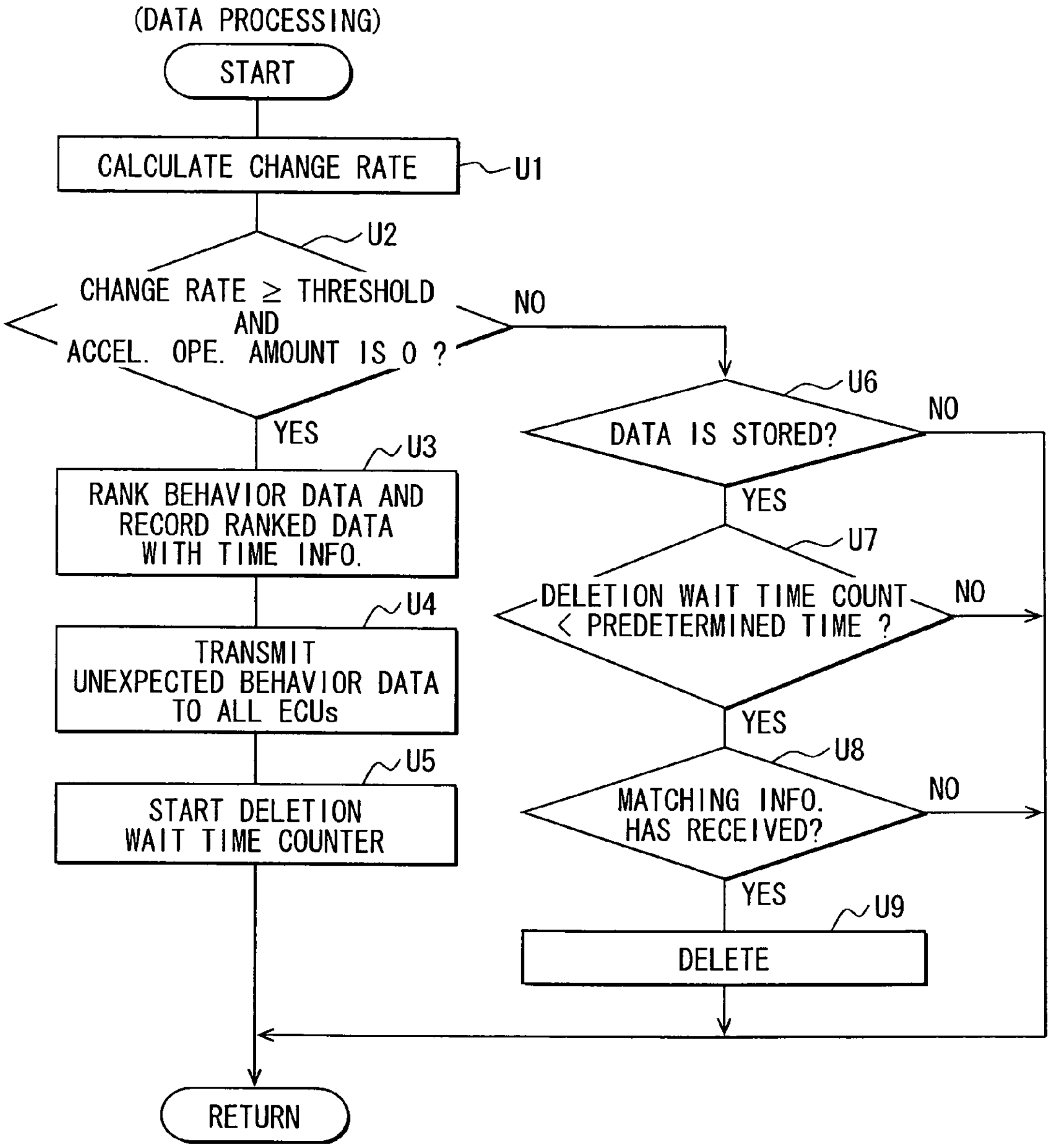
FIG. 3 is a flowchart of data processing performed by a storage control device.

FIG. 3 shows the data processing performed in step T3 as a subroutine. First, in the subroutine, in step U1, a rate of change in the vehicle speed (increase or decrease) from Δt ago is calculated based on sensor information received from the vehicle speed sensor 7. Next, in step U2, the behavior determination section 31 determines whether or not the calculated change rate meets the conditions for determining occurrence of an unexpected behavior. For example, it is determined whether or not an accelerator pedal operation amount is 0 and the change rate is a predetermined value (e.g., a speed increase of 5 km/h or more).

When the calculated change rate is determined to be an unexpected rate of change in the vehicle speed, processing advance to step U3. In step U3, the first storage control section 32 ranks the calculated vehicle speed change rate thereby to provide a result of ranking, and attaches time information to the result of ranking. Additionally, in the nonvolatile memory 35, the first storage control section 32 records the unexpected behavior data so that the unexpected behavior data includes the time information. The vehicle speed change rate is ranked in +1, +2, or +3. Rank +1 is for a speed increase of 5 km/h or more but below 10 km/h; rank +2 is for a speed increase of 10 km/h or more but below 15 km/h; and rank +3 is for a speed increase of 15 km/h or more.

Since step U3 is performed only when the vehicle speed increases, the vehicle speed change rate is ranked in a rank that corresponds to a speed increase. The nonvolatile memory 35 includes a storage area, for example, for three data of the unexpected behavior data. When storing an additional unexpected behavior data after the storage area for the three data is filled, the oldest one of the stored three data is overwritten.

In step U4, the ranked unexpected behavior data attached with the time information, i.e., the result of ranking and the time information, is transmitted to all of the ECU on the CAN 2 via the CAN 2. In step U5, a deletion wait time counter is initialized, and the deletion wait counter starts counting from zero.

Then, the processing advances again to step T2 of the main routine, so that step U1 is performed again. When a step U2 results in NO, in other words, when it is determined that the calculated change rate does not indicate an unexpected behavior, processing advances to step U6. In step U6, it is determined whether or not there is the data that was recorded within a predetermined period of time (e.g., three seconds) of the deletion wait time counter. When it is determined that there is the data, the processing advances to step U7. In step U7, it is determined whether or not counter time of the deletion wait time counter is smaller than a predetermined time of 3 seconds. When the counter time is smaller than 3 seconds, processing advances to step U8. In step U8, it is determined whether the below-described matching information is received from another ECU.

When the storage control device 30 has received the matching information, processing advances to U9. In step U9, the second storage control section 34 of the storage control device 30 deletes the recorded behavior data. When the predetermined time has elapsed without reception of the matching information, corresponding to NO in step U7, processing returns to the main routine without deletion of the recorded unexpected behavior data. That is, the unexpected behavior data is determined to be a true "unexpected behavior data", and the unexpected behavior data is retained.

Figure 4:
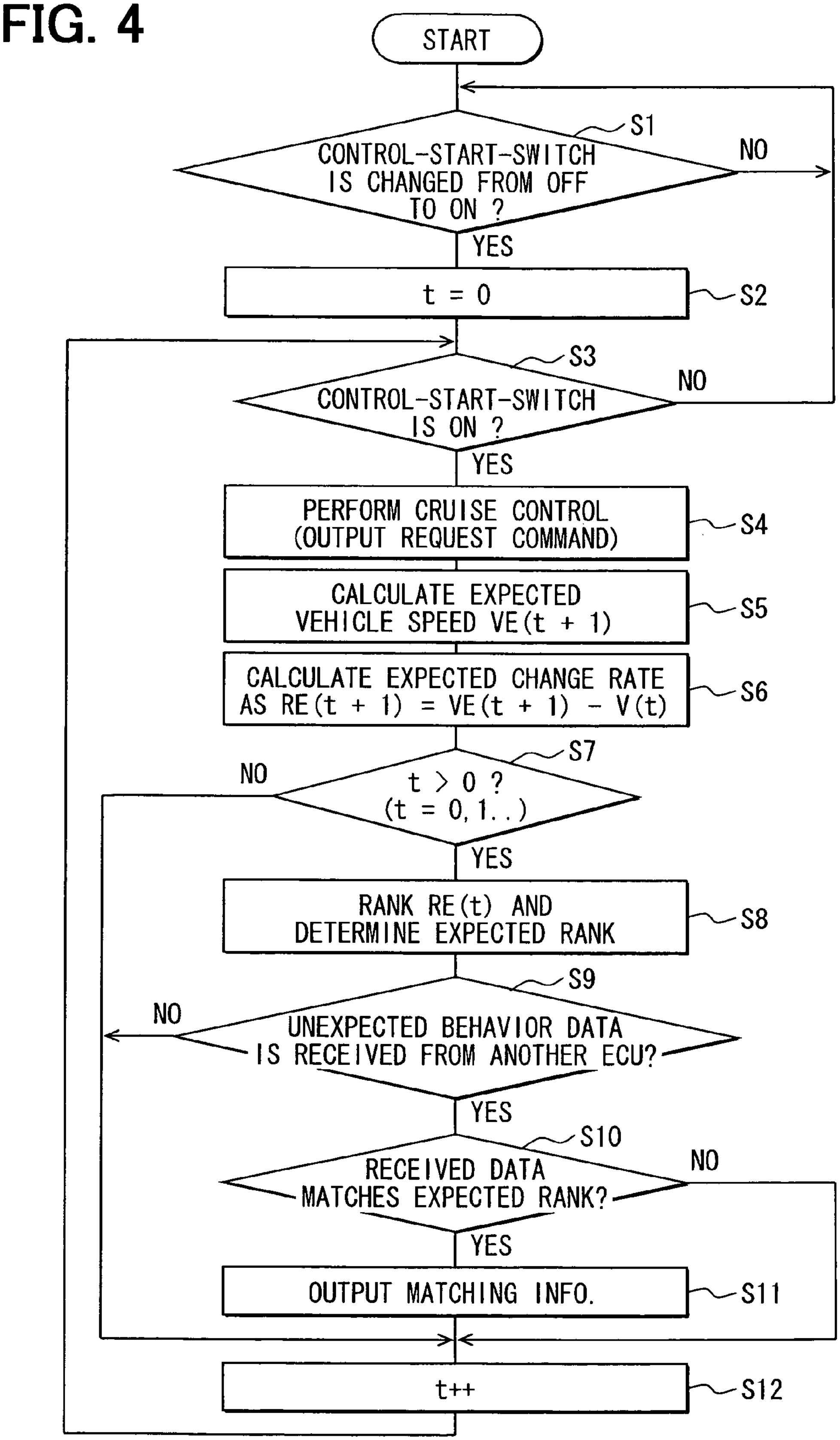
FIG. 4 is a flowchart of control performed by a cruise ECU.

The cruise ECU 4 performs processing shown in FIG. 4. The processing in FIG. 4 includes cruise control processing, estimation processing, determining processing, and output processing. In the cruise control processing, the cruise ECU 4 causes, in accordance with instructions from the driver, the vehicle speed to approach a target value. In the estimation processing, the cruise ECU 4 estimate a behavior data that is estimated to be obtained when the cruise ECU 4 performs the cruise control processing. In the determining processing, when an unexpected behavior that is unexpected to another ECU occurs, the cruise ECU 4 determines whether or not the unexpected behavior is attributed to the cruise control processing performed by the cruise ECU 4. In the output processing, the cruise ECU 4 outputs the matching information in response to determining that the unexpected behavior unexpected to another ECU is attributed to the cruise control processing performed by the cruise ECU 4.

When the behavior that was estimated before the cruise control processing was performed by the cruise ECU 4 matches the behavior that has occurred after the cruise control processing, this matching indicates that the behavior that has occurred is attributed to the control processing performed by the cruise ECU 4. Additionally, a behavior that is unexpected to a certain ECU is a behavior the cause of which cannot be determined based on the information that the certain ECU is having. In cases where an ECU performs control processing for outputting a control command to another ECU, the information that the ECU is having refers to the control command and the sensor information. Since the cruise ECU 4 performs the control processing, the control command corresponds to a request command (described later) and the sensor information corresponds to a sensor signal received from the vehicle speed sensor 7.

In cases where an ECU does not perform the control processing for outputting the control command to another ECU, the information that the ECU is having refers to the sensor information. In the case of the airbag ECU 3, the sensor information corresponds to a sensor signal received from the vehicle speed sensor 7.

Explanation returns to FIG. 4. The processing shown in FIG. 4 is performed at a predetermined period, for example, every Δt second. For example, Δt is 1 second. When a vehicle driver operates the control start switch, the vehicle driver inputs a target vehicle speed. Alternatively, within a predetermined time after operating the control start switch, the vehicle driver may input the target vehicle speed. In the processing shown in FIG. 4, it is assumed for simplification that when the driver turns the control start switch on, the target vehicle speed is set by the driver.

In step S1 shown in FIG. 4, the cruise ECU 4 determines whether or not the state of the control start switch has changed from off to on. When it is determined that the control start switch has been turned on by the driver, processing advances to step S2. When it is determined that the control start switch is not operated by the driver and remains off, processing does not advance. In this case, the cruise ECU 4 waits for the control start switch to be turned on.

In step S2 following step S1, an elapsed time count t is initialized to zero. The elapsed time count t represents the time that has elapsed after turning on of the control start switch. The t=0 correspond to when the control start switch is turned on.

In step S3, the cruise ECU determines whether or not the control start switch still remains on. When the control start switch is in on, processing advances to step S4; otherwise, processing returns to step S1.

In step S4, the cruise control processing is performed. In the cruise control processing, the cruise ECU 4 causes the vehicle speed to approach a target vehicle speed set by the driver. For example, when the target vehicle speed set by the driver is higher than the current vehicle speed, a request command instructing an increase in engine torque is outputted to the engine ECU 5. When the target vehicle speed set by the driver is lower than the current vehicle speed, a request command instructing a decrease in the engine torque is outputted to the engine ECU 5.

In step S5 following step S4, an estimated (expected) vehicle speed after Δt seconds VE(t+1) is calculated based on the request command and the current vehicle speed V(t). The estimated vehicle speed VE(t+1) represents an estimated vehicle speed that is estimated (expected) to achieve after a predetermined time Δt on the assumption that control is normally performed by the cruise ECU 4 as ordered by the driver and that there is no disturbance such as a sudden change in vehicle angularity.

In step S6 following step S5, an estimated (expected) change rate RE(t+1) is calculated. The estimated change rate RE(t+1) is a difference between an estimated vehicle speed VE(t+1) at the time(t+1) and the current vehicle speed V(t) at the current time t. The time(t+1) is a time after a predetermined time Δt from the current time t. In other words, the estimated vehicle speed change rate RE(t+1) represents the degree of vehicle speed change during the predetermined time Δt from the current time t.

In step S7 following step S6, the cruise ECU 4 determines whether or not the current elapsed time count t is larger than 0. In the above, the time when the control start switch is turned on is the basis of the elapsed time count 0 (t=0). In other words, it is determined whether or not a predetermined time Δt has elapsed after turning on of the control start switch. When it is determined that the current elapsed time count t is larger than 0, processing advances to step S8; otherwise, processing advances to step S12. Specifically, step S7 is provided as a branch so that when the processing reaches step S7 for the first time after the control start switch is turned on, calculation of the below-described actual change rate is skipped. In step S12, the elapsed time count t is incremented by 1 and processing returns to step S3.

In step S7, the estimated change rate RE(t) is ranked. Specifically, the estimated change rate RE(t) is ranked in "+1", "+2", "+3", "−1", "−2", or "−3". Rank +1 is for a speed increase of 5 km/h or more but below 10 km/h. Rank +2 is for a speed increase of 10 km/h or more but below 15 km/h. Rank +3 is for a speed increase of 15 km/h or more. Rank −1 is for a speed decrease of 5 km/h or more but below 10 km/h. Rank −2 is for a speed decrease of 10 km/h or more but below 15 km/h. Rank −3 is for a speed decrease of 15 km/h or more.

In step S9 following step S8, the cruise ECU 4 determines whether or not the cruise ECU 4 has received an unexpected behavior data from another ECU (e.g., the airbag ECU 3) connected via the CAN 2. In the above, the unexpected behavior data includes a ranked actual rate of change in vehicle speed, and time information. When the unexpected behavior data is received, in other words, when an unexpected behavior that is unexpected to another ECU has occurred, processing advances to step S10. When the unexpected behavior data is not received, processing advances to step S12.

In step S10, the behavior data comparison determination section 40 of the cruise ECU 4 determines whether or not the unexpected behavior data received from another ECU matches the result of ranking of the estimated change rate RE (t). In the above, the result of ranking of the estimated change rate RE (t) is one that is obtained at substantially the same time when the unexpected behavior data is obtained. In other words, in step S10, the behavior data comparison determination section 40 determines whether or not a difference between the estimated change rate RE(t) and the unexpected behavior data is less than or equal to a predetermined value. When the unexpected behavior data and the result of ranking of the estimated change rate RE(t) match each other, processing advances to step S11; otherwise, processing advances to step S12. In the above, the matching of the unexpected behavior data and the estimated change rate RE(t) indicates that although the unexpected behavior is unexpected to an ECU acting as an output source of the unexpected behavior data, the unexpected behavior has occurred as a result of the cruise control processing that has been performed as expected. That is, in this case, the unexpected behavior is, from viewpoint of the vehicle as a whole, a normal behavior as expected. The time information is attached to both of the estimated change rate RE(t) and the unexpected behavior data. Thus, the cruise ECU 4 may identify the result of ranking of the estimate change rate RE(t) and the unexpected behavior data that have such a mutual relation in which a difference in the time information between the result of ranking of the estimated change rate RE(t) and the unexpected behavior data is less than or equal to a predetermined value. Additionally, the cruise ECU 4 may compare the identified result of ranking of the estimate change rate RE(t) and the identified unexpected behavior data with each other.

In step S11, the matching information transmission section 42 of the cruise ECU 4 broadcasts the matching information to multiple ECUs on the CAN 2. Alternatively, the matching information transmission section 42 may not broadcast the matching information. Instead, the cruise ECU 4 may identify a certain ECU that is an output source of the unexpected behavior data, and may transmit the matching information to the certain ECU.

As described above, when the rank of the vehicle speed change rate included in the unexpected behavior data from another ECU (e.g., the airbag ECU 3) matches the rank of the vehicle speed change rate estimated by the cruise ECU 4, the cruise ECU 4 informs another ECU that the unexpected behavior data is, from the viewpoint of the vehicle as a whole, indicates a behavior that has occurred as expected.

Hence, in step U8 in FIG. 3, the storage control device 30 may receive the matching information, which indicates that the behavior determined to be an unexpected behavior by the storage control device 30 itself is attributed to the control processing performed by another ECU. When the storage control device 30 receives this matching information, the processing advances to U9. In next step U9, the storage control device 30 deletes the stored unexpected behavior data that is attributed to the control processing performed by another ECU.

According to the present embodiment, when the behavior determination section 31 of the storage control device 30 determines that there is an unexpected behavior, the first storage control section 32 once records the unexpected behavior data and the unexpected behavior data transmission section 33 transmits the unexpected behavior data to the CAN 2. In the ECU 4, the behavior data comparison determination section 40 determines whether or not an estimated behavior (also called "expected behavior") estimated to occur due to the control processing performed by the ECU 4 matches content of the unexpected behavior data. When the data of the estimated behavior and the unexpected behavior data match each other, the behavior data comparison determination section 40 determines that the behavior indicated by the unexpected behavior data is, from the viewpoint of the vehicle as a whole, a behavior as expected. Further, the matching information transmission section 41 transmits the matching information to the CAN 2. Then, when the second storage control section 34 of the storage control device 30 acquires the matching information, the second storage control section 34 deletes the unexpected behavior data stored in the non-volatile memory 35. As a result, only the unexpected behavior data appropriate for analysis is stored in the non-volatile memory 35. Therefore, it becomes possible to adequately analyze the unexpected behavior.

In the above, instead of deletion of the unexpected behavior data, the second storage control section 34 may permit overwriting the unexpected behavior data. In this case, "permit overwriting" is to prohibit data from being read and permit the data to be overwritten. Therefore, in the non-volatile memory 35, only the unexpected behavior data appropriate for analysis is stored in a readable state (an available state). Therefore, it becomes possible to adequately analyze the unexpected behavior.

Moreover, at a time when the behavior determination section 31 of the storage control device 30 determines that the unexpected behavior has occurred, the unexpected behavior data indicating the unexpected behavior at that time is recorded. Therefore, it is possible to secure a latest behavior data. Moreover, when the cruise ECU 4 compares the unexpected behavior data with the behavior estimated to occur due to the control processing performed by the ECU and determines that the unexpected behavior data matches the estimated behavior, the cruise ECU 4 transmits the matching information. Therefore, as compared with a case where the cruise ECU 4 constantly performs data transmission, the present embodiment can reduce congestion of communications on the CAN 2. Furthermore, since it is sufficient for this matching information to indicate the data matching, the matching information requires a remarkably small data amount (e.g., 1 bit). Because of this also, it is possible to further reduce the congestion of communications on the CAN 2. As a result, there is no disturbance to communications between other ECUs or communications between each behavior sensor and each ECU. Moreover, since a data amount of the matching information can be small, the matching information can be transmitted at a high transmission speed.

Moreover, according to the present embodiment, the unexpected behavior data includes the time information. Additionally, the estimated behavior data, which indicates the behavior estimated to occur due to the control processing performed by the cruise ECU 4, includes the time information. In the above, the time information of the unexpected behavior data and that of the estimated behavior data are common time information. When the behavior estimated to occur due to the control processing performed by the cruise ECU itself at a time indicated by certain time information included in the unexpected behavior data matches the unexpected behavior data including this certain time information, the behavior data comparison determination section 40 determines that the behavior indicated by the unexpected behavior data is the expected one from viewpoint of the vehicle a whole. Specifically, in addition to determining whether or not the data of the unexpected behavior recorded by the first storage control section 32 and the data of the estimated behavior estimated to occur due to the control processing of the cruise ECU 4 match each other, it is possible to determine whether or not the time information of the data of the unexpected behavior matches that of the data of the estimated behavior. Therefore, it becomes possible to make a precise determination whether the unexpected behavior data is a data to be stored.

In the present embodiment, when the cruise ECU 4 is in an operation state where the cruise ECU 4 controls a control target, in other words, only when the cruise ECU 4 performs the cruise control, the cruise ECU 4 accepts reception of the unexpected behavior data. Thus, the following advantage can be obtained.

Specifically, when the cruise ECU 4 is in the operation state, the cruise ECU 4 estimates the behavior that will occur due the control processing. The data of this estimated behavior is suitable information for the storage control device 30 to make a determination whether or not the unexpected behavior data is to be stored. Thus, when the cruise ECU 4 is in the operation state, it is not wasteful for the behavior data comparison determination section 40 to compare both data with each other. In another case where the cruise ECU 4 is not in the operation state, i.e., where the curies ECU 4 is not performing the control processing, a behavior change attributed to the control processing of the cruise ECU 4 does not occur at all. In this case, it is wasteful for the behavior data comparison determination section 40 to compare both of the unexpected behavior data and the unexpected behavior data with each other. The present embodiment addresses the above. According to the present embodiment, only when the cruise ECU 4 is in the operation state where the cruise ECU 4 controls the control target, the cruise ECU 4 accepts reception of the unexpected behavior data. Therefore, only when the cruise ECU 4 can calculate the estimated behavior data (also called "expected behavior data"), which is estimated from the control processing, as the suitable information for making the determination as to the unexpected behavior data, the cruise ECU 4 accepts reception of the unexpected behavior data and operates the behavior data comparison determination section 40 and the matching information transmission section 41. Therefore, a result of determination by the behavior data comparison determination section 40 becomes precise. Additionally, wasted operations of the behavior data comparison determination section 40 and the matching information transmission section 41 when the cruise ECU 4 is not in the operation state can be eliminated.

Moreover, the matching information transmission section 41 broadcasts the matching information to multiple ECUs connected with the CAN 2. Thus, even when each of the multiple ECUs includes the storage control device and even when the multiple ECUs simultaneously record the unexpected behavior data by determining occurrence of the unexpected behavior, it is possible inform, at one time, these ECUs that the unexpected behavior data should be deleted.

Moreover, according to the present embodiment, the storage control device 30 is provided in the airbag ECU 3 that is a different type ECU from the cruise ECU 4 and engine ECU 5. This allows the airbag ECU 3 to also serve as the behavior determination section 31, the first storage control section 32, the unexpected behavior data transmission section 33 and the second storage control section 34 of the storage control device 30.

Alternatively, the storage control device 30 may be provided separately from the ECUs 3, 4, and 5. In the above example of the present embodiment, each of the unexpected behavior data and the behavior estimated from the control processing (i.e., the estimated change rate) are ranked. Alternatively, when the estimated change rate estimated by the cruise ECU 4 is included in the ranked information indicative of the behavior of the unexpected behavior data, the cruise ECU 4 may output the matching information. Alternatively, both of or one of the unexpected behavior data and the behavior estimated from the control processing (the estimated change ratio) may be ranked.

Second Embodiment

Figure 5:
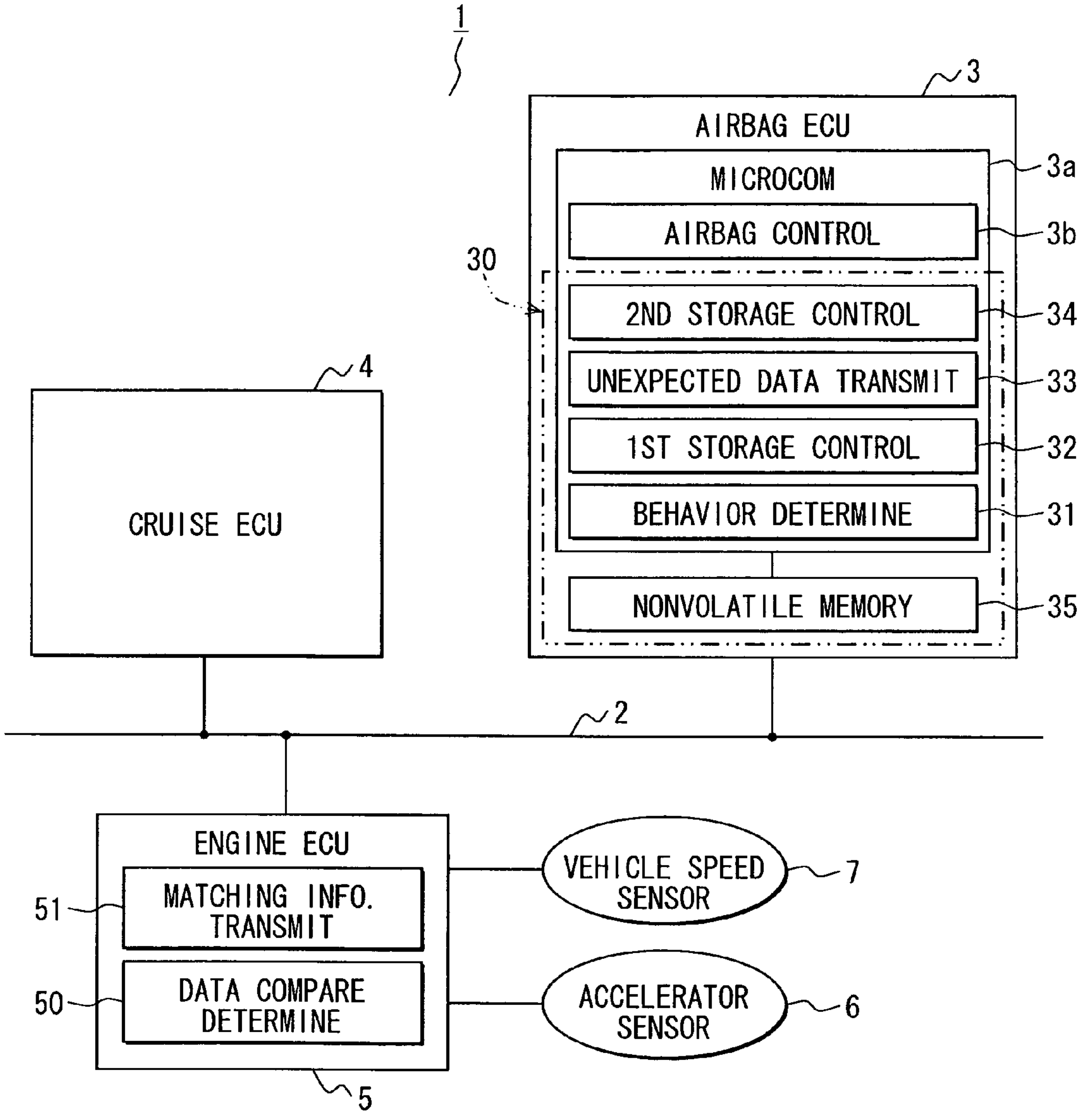
FIG. 5 is a functional block diagram of a vehicle behavior data storage control system according to a second embodiment.

FIG. 5 shows a second embodiment. The second embodiment is different from the first embodiment in the following points. In the second embodiment, besides the airbag ECU 3 including the storage control device 30, multiple ECUs such as the cruise ECU 4, the engine ECU 5 and the like are provided in the vehicle behavior data storage control system as in the first embodiment. The engine ECU 5 may be referred to as a first ECU. The cruise ECU 4 may be referred to as a second ECU. The engine ECU 5 controls a throttle valve acting as an actuator based on the data (sensor signals) received from the accelerator position sensor 6 and the vehicle speed sensor 7 each acting as a behavior sensor. The cruise ECU 4 does not directly receive the data from the vehicle speed sensor 7 acting as the behavior sensor. From the engine ECU 5 via the CAN 2, the cruise ECU 4 only receives data (a sensor signal) generated by the vehicle speed sensor 7 and outputs a request command to the engine ECU 5. In this configuration, the cruise ECU 4 does not include the behavior data comparison determination section 40 and the matching information transmission section 41. The engine ECU 5 includes the behavior data comparison determination section 40 and the matching information transmission section 41. The engine ECU 5 transmits the matching information to the CAN 2. According to the second embodiment, the engine ECU 5, which directly controls the actuator, transmits the matching information. Therefore, it is possible to promptly provide the matching information.

Third Embodiment

Figure 6:
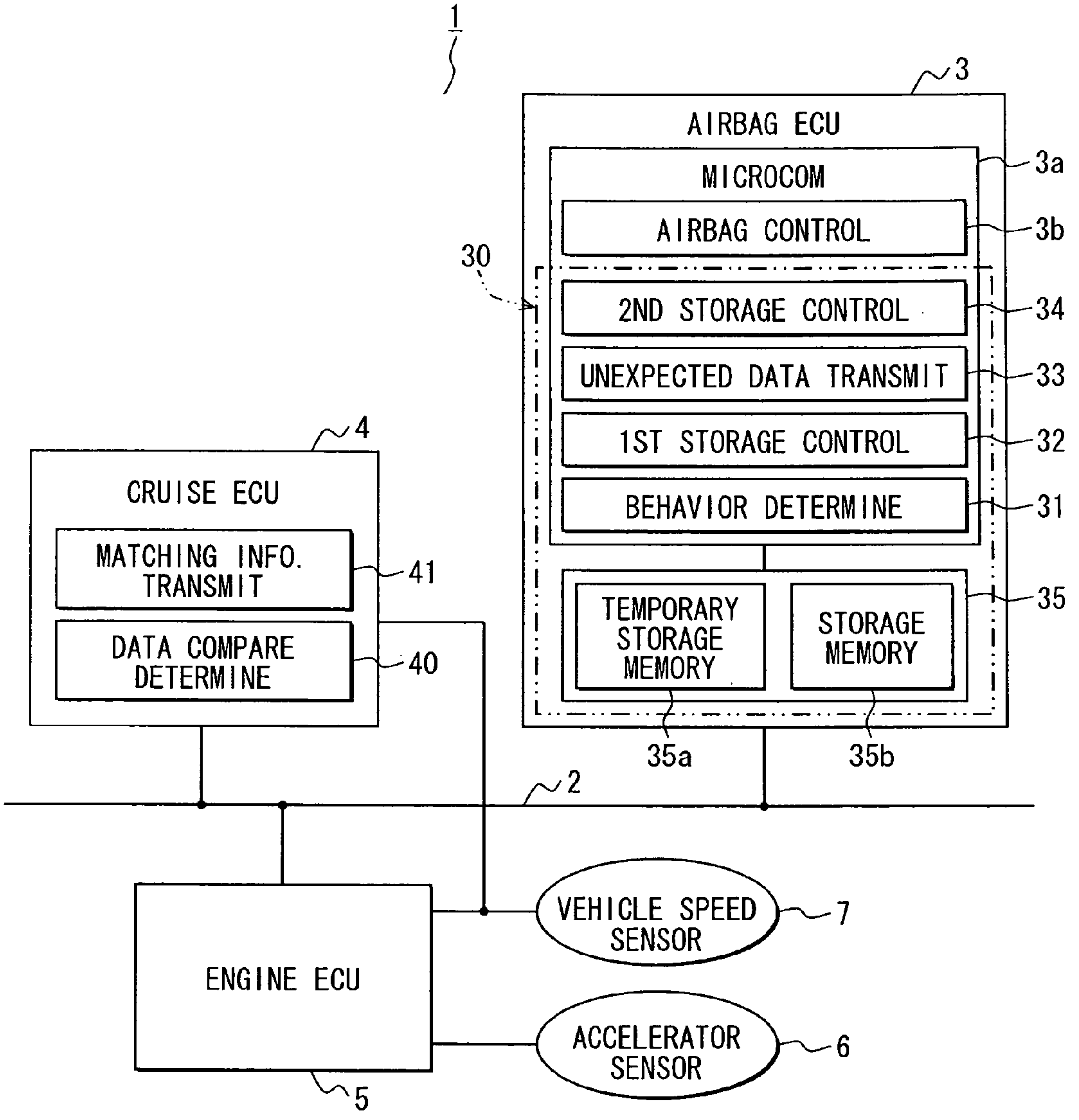
FIG. 6 is a functional block diagram of a vehicle behavior data storage control system according to a third embodiment.
Figure 7:
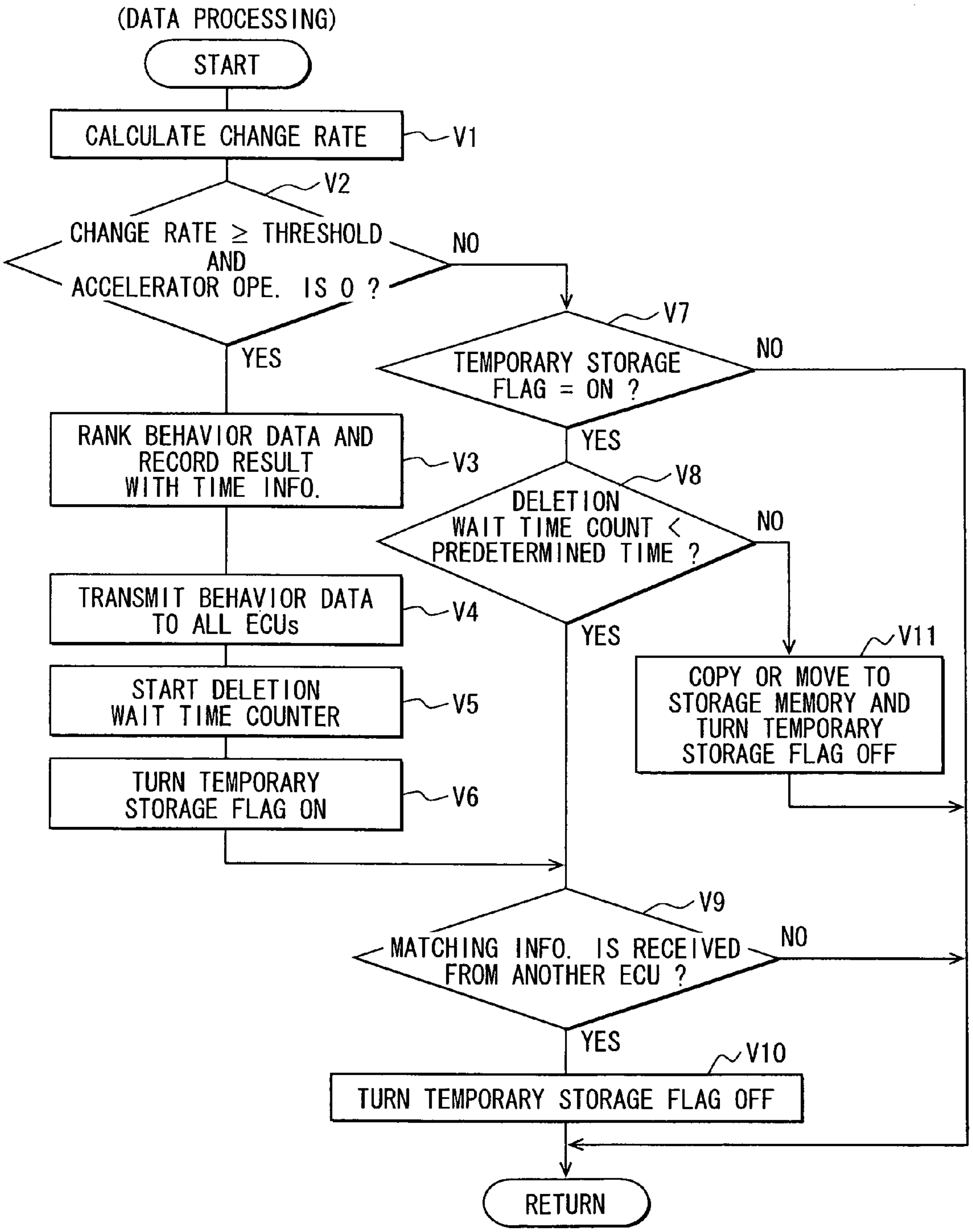
FIG. 7 is a flowchart of data processing according to the third embodiment.

FIGS. 6 and 7 show a third embodiment. The third embodiment is different from the first embodiment in the following points. The storage section (nonvolatile memory 35) includes a temporary storage memory 35*a* and a storage memory 35*b*. The temporary storage memory 35*a* can act as a first memory and a first memory means. The storage memory 35*b* can acts as a second memory and a second memory means. The temporary storage memory 35*a* includes a volatile memory, e.g., an SRAM, which is a volatile memory having relatively small degradation associated with data writing. The storage memory 35*b* includes a nonvolatile memory, e.g., a flash memory capable of retaining stored data even when the power is turned off. A different memory configuration may also be used. For example, a predetermined area of a nonvolatile memory may be used as a first memory and another predetermined area of the nonvolatile memory may be used as a second memory.

FIG. 7 shows a subroutine of storage control performed by the airbag ECU 3. The subroutine is executed by being called from the main routine, which is described in the above with reference to FIG. 3. The control processing of the present embodiment shown in FIG. 7 corresponds to that of the first embodiment shown in FIG. 3.

In step V1, in a manner similar to that in step U1 of FIG. 3, a vehicle speed change rate is calculated. In step V2 following step V1, in a manner similar to that in step U2 of FIG. 3, it is determined whether or not the calculated change rate meets a condition for determining occurrence of an unexpected behavior. For example, it is determined whether or not the accelerator operation amount is 0 and the change rate is a predetermined value (e.g., a speed increase of 5 km/h or more). When it is determined that the change rate meets the condition for determining occurrence of an unexpected behavior, processing advances to step V3; otherwise, processing advances to step V6.

In step V3, in a manner similar to that in step U3 of FIG. 3, when the change rate indicates the unexpected behavior, the vehicle speed change rate (vehicle information) is ranked. Additionally, together with time information, a result of the ranking is recorded as the unexpected behavior data in the temporary storage memory 35*a*. In this case, if the past vehicle information is stored, the past vehicle information is overwritten.

In step V4 following step V3, in a manner similar to that in step U4 of FIG. 3, the ranked unexpected behavior data attached with the time information, which are the result of ranking and the time information, are transmitted to all ECUs on the CAN 2 via the CAN 2.

In step V5 following step V4, in a manner similar to that in step U5 of FIG. 3, the deletion wait time counter starts counting. In step V6 following step V5, a temporary storage flag, which is provided in the temporary storage memory 35*a*, is turned on. In step V9 following step V6, it is determined whether or not the matching information has been received from another ECU such as cruise ECU 4 and the like. When it is determined that the matching information has been received from another ECU, processing advances to step V10; otherwise, the subroutine is terminated, so that processing returns to the above-described step T2.

When it is determined in step V2 that the change rate does not meet the condition for determining occurrence of an unexpected behavior, processing advances to step V7. In step V7, it is determined whether or not the temporary storage flag is on. When it is determined that the temporary storage flag is on, processing advances to step V8; otherwise (flag is off), the subroutine is terminated.

In step V8, it is determined whether or not the deletion wait time counter is less than a predetermined time. When it is determined that the deletion wait time counter is less than the predetermined time, processing advances to step V9; otherwise (the predetermined time has been reached or exceeded), processing advances to step V11.

In step V11, the unexpected behavior data stored in the temporary storage memory 35*a* is copied or moved to the storage memory 35*b*. This is because the matching information, which indicates that the unexpected behavior data stored in the temporary storage memory 35*b* is attributed to normal control processing performed by another ECU, has not been received until the deletion wait time counter reaches the predetermined time. Furthermore, in step V11, the temporary storage flag is turned off, so that step V11 is performed only after next occurrence of an unexpected behavior is determined.

When it is determine that the deletion wait time counter is less than the predetermined time (step V8=YES), processing advances to step V9. In another case, from step V6, processing advances to step V9. In step V9, it is determined whether or not the matching information has been received from another ECU. When it is determined that the matching information has been received from another ECU, processing advances to step V10; otherwise, the subroutine is terminated.

In step V10, because it has been determined in step V9 that the unexpected behavior data is attributed to the control processing performed by another ECU, the temporary storage flag is turned off, so that only after next occurrence of an unexpected behavior is determined in step V2, step V11 is performed.

According to the third embodiment, the storage memory 35*b* is used to store only the unexpected behavior data. The storage area of the storage memory 35*b* can be fully used for the unexpected behavior data that is adapted to be used in analysis. This configuration may be suitable to cases where the storage memory 35*b* has a small storage capacity. Specifically, taking cost into account and considering that there is much data to be stored, the storage memory 35*b* may have a limited storage capacity for the unexpected behavior data and an amount of data storable in the storage memory 35*b* may be limited also. In this case, when at least one data of behavior data not corresponding to the unexpected behavior is stored in the storage memory 35*b* incapable of storing a large amount of data, the available data area for storing the unexpected behavior data further decreases. This decreases a data utilization efficiency. In this regard, according to the present embodiment, after an unexpected behavior data is confirmed to truly correspond to an unexpected behavior, the unexpected behavior data is recorded in the storage memory 35*b*. Therefore, even if the storage capacity of the storage memory 35*b* is small and the number of data storable in the storage memory 35*b* is small, the unexpected behavior data can be fully stored. Therefore, the data usage efficiency can be enhanced.

Moreover, even if the latest data stored in the storage memory 35*b* is deleted for some reasons when the stored latest data is being used, the same data remains stored in the temporary storage memory 35*a*. Therefore, it is possible to provide a data retention advantage.

With the use of the temporary storage flag, the system can be configured as follows. If the vehicle information is stored in the storage memory 35*b*, the vehicle information can be copied only once from the temporary storage memory 35*a* to the storage memory 35*b* when a predetermined period of time has elapsed from detection of an unexpected behavior. In this way, the same vehicle information can be prevented from being repeatedly copied to the storage memory 35*b* within or after a predetermined period of time. Because of this, a memory such as flash ROM and EEPROM, which have a limited writing speed and a limited number of writing cycles, can used as the storage memory 35*b*. Moreover, even in cases where the use of both the predetermined period of time and the temporary storage flag causes, for example, frequent occurrences of interrupt processing and lengthens the period of storage control processing, it is possible to copy, after elapse of the predetermined period of time, the vehicle information to the storage memory 35*b* provided that the matching information has not been received. It should be noted that it may be sufficient for the temporary storage memory 35*a* to have a storage capacity corresponding to a single unexpected behavior data.

Fourth Embodiment

Figure 8:
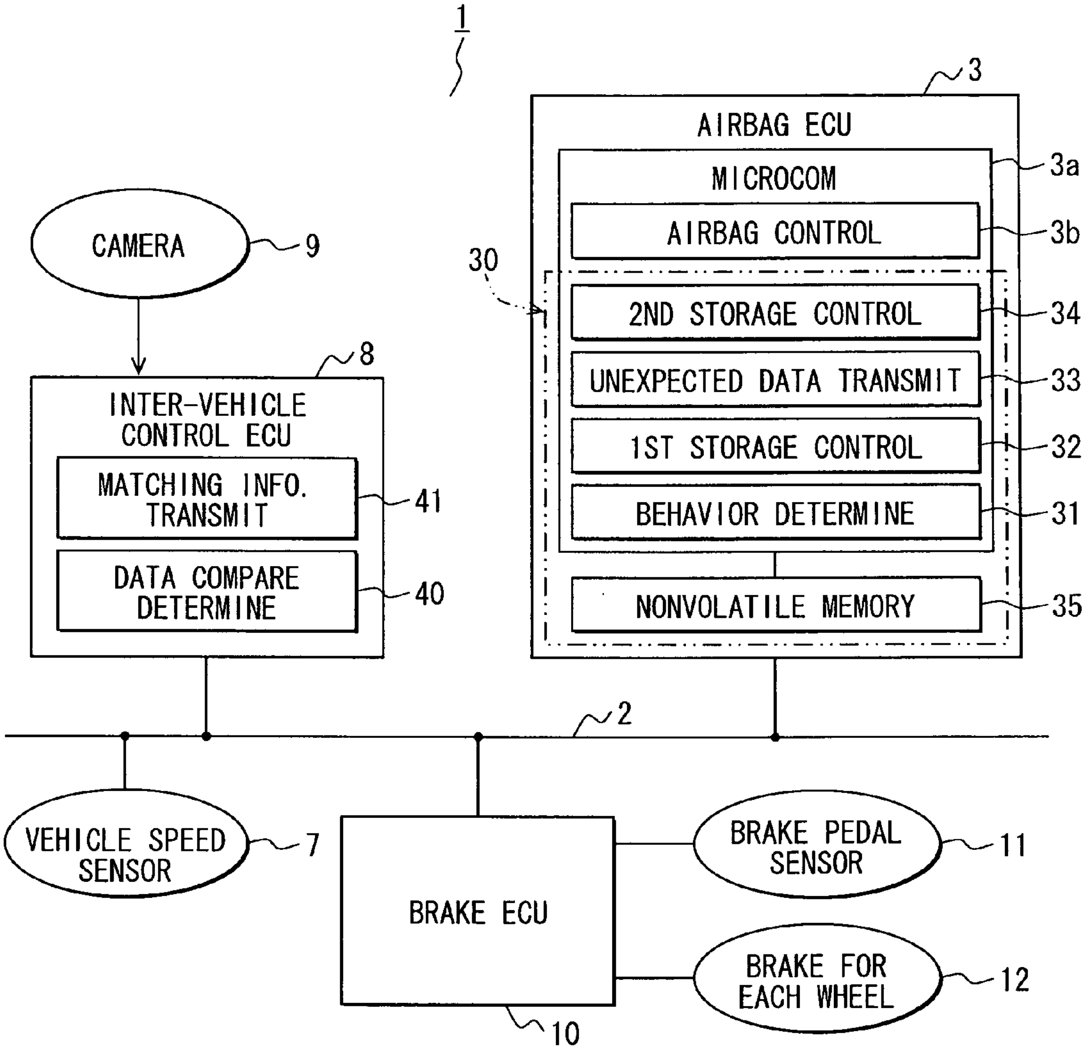
FIG. 8 is a functional block diagram of a vehicle behavior data storage control system according to a fourth embodiment.

A fourth embodiment will be described below with reference to FIGS. 8 to 10. In the fourth embodiment, an inter-vehicle control electronic control unit (ECU) 8 is connected with the CAN 2 acting as the in-vehicle network. Based on image information from a stereo camera 9, the inter-vehicle control ECU 8 detects a distance to a vehicle traveling directly ahead. When the detected inter-vehicle distance is shorter than a predetermined value, the inter-vehicle control ECU 8 outputs a braking command to a brake ECU 10, which is connected to the CAN 2, to perform vehicle braking to avoid, for example, a collision. Like the above-described cruise ECU 4 includes, the inter-vehicle control ECU 8 includes the matching information transmission section 41, and the behavior data comparison determination section 40.

The brake ECU 10 is electrically connected to a brake pedal sensor 11, which detects an amount of pressing a brake pedal (brake pedal operation amount) and outputs the detected brake pedal operation amount to the CAN 2. The brake ECU 10 also controls a hydraulic unit, typically ABS, provided with a brake fluid pressurization source (pump) for pressurizing a brake fluid, a pressure reducing valve, and a pressure increasing valve. The brake ECU 10 controls, via the hydraulic unit, the pressure of hydraulic oil sent to the piston of the brake caliper for each wheel. In FIG. 8, the brake ECU 10 is represented, for convenience sake, as being connected to the brake of each wheel 12. When a braking command is received from the inter-vehicle control ECU 8, the brake ECU 10 operates the brake of each wheel 12 via the hydraulic unit to decelerate the vehicle.

Next, a logic of control processing performed by the inter-vehicle control ECU 8 will be described with reference to FIG. 9. When the inter-vehicle control is put in an active state by the driver, the processing shown in FIG. 9 is performed at predetermined time intervals (e.g., every 10 milliseconds). In step S1*a* shown in FIG. 9, the inter-vehicle control ECU 8 determines whether or not the inter-vehicle distance, which is determined based on the image information from the stereo camera 9, is less than or equal to a predetermined value. When the inter-vehicle distance is less than or equal to the predetermined value, processing advances to step S2. When the inter-vehicle distance is not less than or equal to the predetermined value, the inter-vehicle control ECU 8 wails for a decrease in the inter-vehicle distance to the predetermined value or less.

In step S2 following step S1*a*, an elapsed time count t is initialized to 0. The elapsed time count t can be restated as a time that has elapsed after the decrease in the inter-vehicle distance to the predetermined value or less. In step S3*a*, it is determined whether or not the inter-vehicle distance is less than or equal to the predetermined value. When the inter-vehicle distance is less than or equal the predetermined value, processing advances to step S4*a*; otherwise, processing returns to step S1*a*.

In step S4*a*, the inter-vehicle control ECU 8 performs brake control. In the brake control, the inter-vehicle control ECU 8 outputs a braking command to the brake ECU 10 instructing that, even when the brake pedal is not stepped on by the driver, the vehicle is forcibly decelerated. In step S5*a* following step S4*a*, an estimated vehicle speed VE(t+1) after Δt second is calculated based on the braking command and the current vehicle speed V(t). The estimated vehicle speed VE(t+1) represents a vehicle speed that is estimated to realize after a predetermined time Δt on the assumption that the inter-vehicle control ECU 8 normally performs control based on the instructions from the driver and that there is no disturbance such as a sudden change in vehicle angularity.

Figure 9:
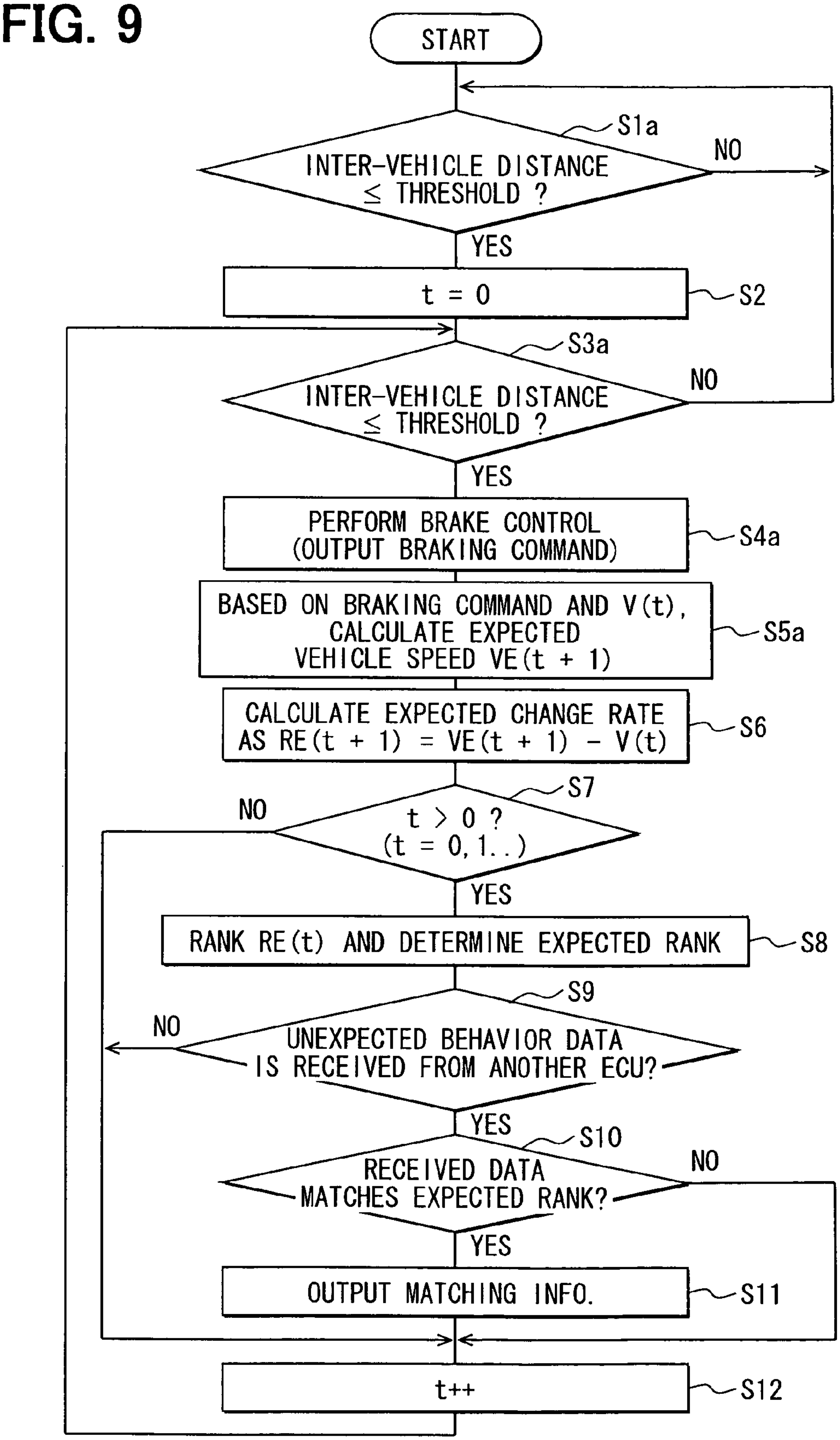
FIG. 9 is a flowchart of control performed by an inter-vehicle control ECU.

The subsequent steps S6 to S12 in FIG. 9 are substantially the same as the steps S6 to S12 in FIG. 4. That is, when the inter-vehicle control ECU 8 receives the unexpected behavior data from another ECU while performing inter-vehicle distance control, the inter-vehicle control ECU 8 determines whether or not the behavior indicated by the received unexpected behavior data is the same as or similar to the estimated behavior, which is a behavior estimated to occur due to the control processing performed by the inter-vehicle control ECU 8. When the behavior indicated by the received unexpected behavior data is the same as or similar to the estimated behavior, the inter-vehicle control ECU 8 transmits the matching information. That is, when the behavior attributed to the control processing of the inter-vehicle control ECU 8 is recognized as the unexpected behavior by another ECU, the inter-vehicle control ECU 8 uses the matching information to inform another ECU that the unexpected behavior data needs not be stored.

Figure 10:
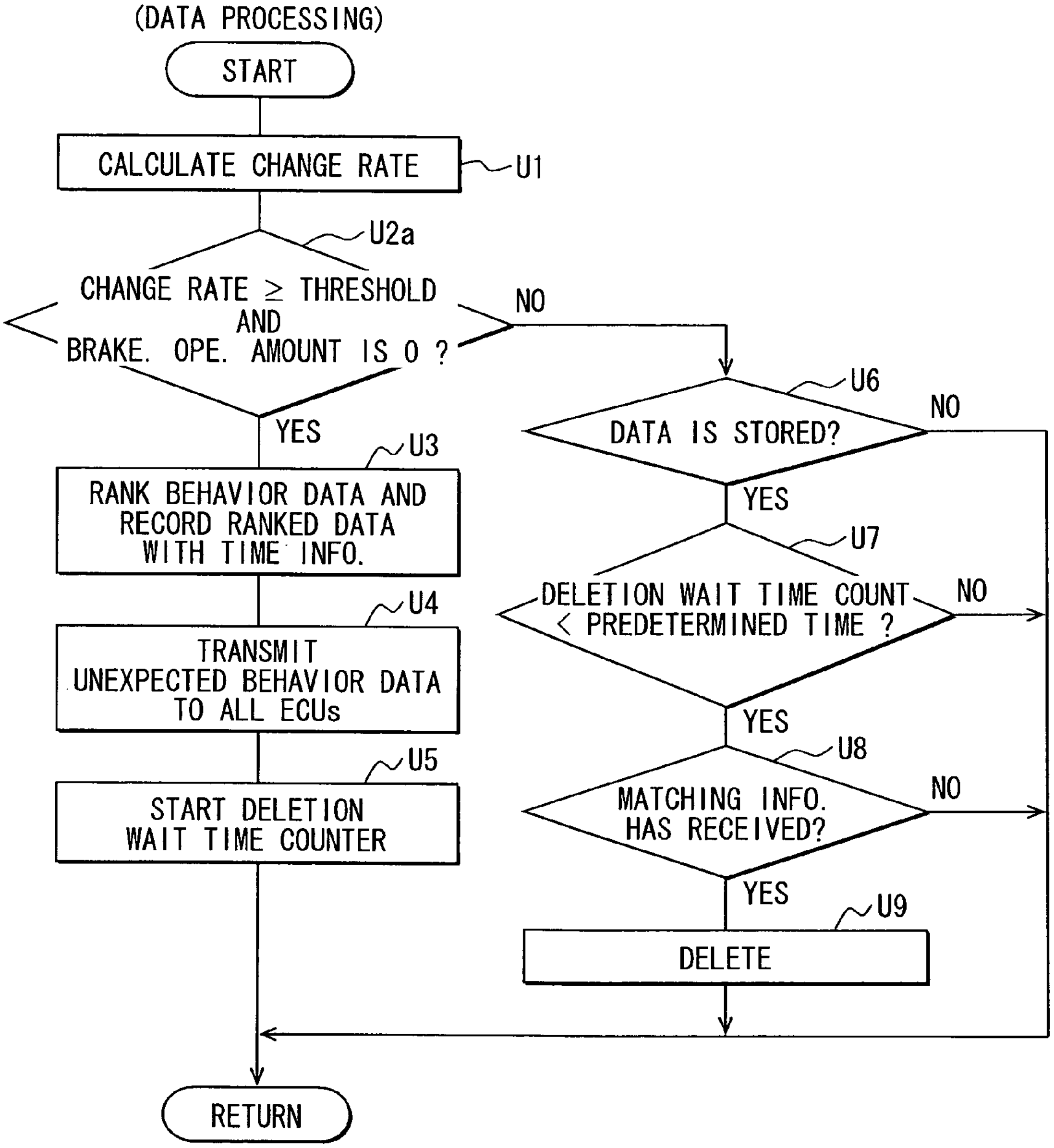
FIG. 10 is a flowchart of data processing performed by a storage control device according to the fourth embodiment.

When the airbag ECU 3 performs the storage control shown in FIG. 2, the airbag ECU 3 performs, as the data processing in step T3, the processing shown in FIG. 10 in stead of the processing shown in FIG. 3. The processing of FIG. 10 may be performed after completion of the processing of FIG. 5 and vice versa.

In the following, the processing shown in FIG. 10 will be explained. Since the processing shown in FIG. 10 is similar to that in FIG. 5. The processing in FIG. 10 is different from that in FIG. 5 in that the processing in FIG. 10 includes step U2*a*. In step U2*a*, the behavior determination section 31 of the airbag ECU 3 determines whether or not a brake pedal operation (pressing) amount is zero and the change rate is equal to or larger than a predetermined value. In the above, the change rate is positive when the vehicle decelerates. The predetermined value may be 5 km/h.

Specifically, in the processing shown in FIG. 10, when a relatively large deceleration of 5 km/h or more occurs regardless of no driver's operation of the brake pedal, it is determined that the unexpected behavior has occurred. Then, in a manner similar to that in FIG. 5, the behavior data at that time and the time information are recorded as the unexpected behavior data. Additionally, the unexpected behavior data is broadcasted to the CAN 2. Then, as described above, if the inter-vehicle control ECU 8 is performing the control processing, it is determined whether the unexpected behavior data is attributed to the control processing of the inter-vehicle control ECU 8. When the unexpected behavior data is attributed to the control processing of the inter-vehicle control ECU 8, the inter-vehicle control ECU 8 broadcasts the matching information to delete the unexpected behavior data stored in the airbag ECU 3.

As described above, the condition for determining an unexpected behavior is not limited to the accelerator operation amount being 0 as in the first and second embodiments. The condition may be based, for example, on the brake pedal operation amount. Also, the unexpected behavior need not necessarily relates to only one behavior, for example, acceleration. There may be multiple unexpected behaviors, which relate to, for example, acceleration, deceleration, and the like.

Other Embodiments

Embodiments of the present embodiment are not limited to the foregoing embodiments. Examples of other embodiments will be described.

For example, the unexpected behavior data transmitted from the storage control device 30 to the CAN 2 may be limited to being transmitted to an ECU that relates to the storage control device. For example, the cruise ECU 4 may be designated a destination of the unexpected behavior data. According to this configuration, another ECU connected to the CAN 2 can avoid receiving and processing an irrelevant behavior data.

Alternatively, each of multiple ECUs connected with the in-vehicle network may individually include the storage control device, the behavior data comparison determination section, and/or the matching information transmission section. The storage control device of each ECU may transmit to another ECU the unexpected behavior data determined by the each ECU itself. The another ECU may receive the unexpected behavior data, and may compare the received unexpected behavior data with a behavior data of the another ECU itself to determine whether or not the received unexpected behavior data matches the behavior data of the another ECU.

When the another ECU determines that the received unexpected behavior data matches the behavior data of the another ECU, the another ECU may transmit the matching information. According to this configuration, the unexpected behavior data and the matching information can be transmitted between multiple ECUs. Thus, each ECU can determine adequateness of the unexpected behavior data.

In the above embodiments, examples of behaviors that are unexpected to the storage control device include: the acceleration that is not attributed to the operation of the accelerator pedal or not attributed to the on state of the cruise control start switch; and the deceleration that is not attributed to the operation of the brake pedal or not attributed to the active state of the inter-vehicle distance control. However, the unexpected behavior is not limited to the above examples. For example, when the engine rotation speed rises even if the driver is maintaining the accelerator pedal at a certain position to maintain the engine rotation as a steady state at a constant speed, this rising of the engine rotation speed may be regarded as an unexpected behavior. In this case, the airbag ECU 3 determines the rising of the engine rotation speed as an unexpected behavior and temporarily stores the unexpected behavior data in the nonvolatile memory 35. However, if it is subsequently determined that the rising of the engine rotation speed results from driver's operation of the air-conditioner panel to cause an air-conditioner ECU (not shown) to activate a compressor, the air-conditioner ECU transmits the matching information to the CAN to indicate that the rising of the engine rotation speed is attributed to the control processing performed by the air-conditioner ECU. Then, based on the matching information received from the air-conditioner ECU, the airbag ECU 3 deletes the unexpected behavior data stored in the nonvolatile memory 35 or changes the stored vehicle information into an overwritable state. That is, the unexpected behavior is not limited to the acceleration, the deceleration, and the engine speed increase. In addition, the ECU for outputting the matching information is not limited to the cruise ECU 4 and the air-conditioner ECU.

The vehicle information may correspond to a behavior data. However, information to be recorded by an ECU when the unexpected behavior occurs is not limited to the vehicle information. Together with the vehicle information, an ECU may record control information outputted from the ECU itself. The control information may include a control command to an actuator or another ECU.

The present disclosure has various aspects.

In one aspect, the following points are taken into account. A storage control device determines occurrence of an unexpected behavior and records a behavior data at that time as an unexpected behavior data in a memory section. In this case, If the storage control device acquires content of control processing performed by another ECU via an in-vehicle network and determines that the unexpected behavior data is in a range of behavior data attributed to control processing normally performed by the another ECU, the storage control device can determine that occurrence of the unexpected behavior data stored in the memory section results from the control processing performed by the another ECU. In this case, when the stored unexpected behavior data is deleted, only a truly-unexpected behavior data is stored in the memory section.

In this regard, however, if, to the in-vehicle network, another ECU constantly transmits (sends) content of the control processing of the another ECU or an estimated behavior data indicative of a behavior estimated to occur as result of the control processing, communications on the CAN 2 may be congested. Accordingly, a trouble may be brought to communications between other ECUs and between each behavior sensor and each ECU.

In consideration of the above, a vehicle behavior data storage control system can be configured as follows. The vehicle behavior data storage control system comprises a storage control device and an electronic control unit (ECU) that controls a predetermined control target and is connected to the storage control device via an in-vehicle network to enable data exchange with the storage control device. The storage control device includes a behavior determination section and a memory section. The behavior determination section acquires behavior data and determines whether or not an unexpected behavior has occurred based on the acquired behavior data. The memory section is provided to store the behavior data associated with the unexpected behavior as an unexpected behavior data. The storage control device further includes a first storage control section that records in the memory section the behavior data at a time when the behavior determination section determines that the unexpected behavior has occurred, so that the behavior data associated with the unexpected behavior is stored as the unexpected behavior data in the memory section. The storage control device further includes an unexpected behavior data transmission section that transmits the unexpected behavior data to the in-vehicle network. The ECU includes a behavior data comparison determination section that (i) calculates an estimated behavior data indicative of an estimated behavior, which is a behavior estimated to occur due to control processing performed by the ECU, and (ii) determines whether or not content of the unexpected behavior data, which is transmitted from the storage control device to the in-vehicle network, matches that of the estimated behavior data. When the content of the unexpected behavior data matches that of the estimated behavior data, the behavior data comparison determination section determines that occurrence of the unexpected behavior is attributed to the control processing performed by the ECU. The ECU further includes a matching information transmission section that transmits matching information to the in-vehicle network when the behavior data comparison determination section determines that the content of the unexpected behavior data matches that of the estimated behavior data. The storage control device further includes a second storage control section that, upon receipt of the matching information, deletes or permits overwriting the unexpected behavior data stored in the memory section.

According to the above vehicle behavior data storage control system, when the behavior determination section of the storage control device determines that the unexpected behavior has occurred, the first storage control section once records the behavior data at that time in the memory section, and the unexpected behavior data transmission section transmits the unexpected behavior data to the in-vehicle network. The behavior data comparison determination section of the ECU determines whether or not the content of the unexpected behavior data matches that of the estimated behavior data, which is indicative of the behavior estimated to occur due to the control processing of the ECU. When the content of the unexpected behavior data matches that of the estimated behavior data, the behavior data comparison determination section determines that occurrence of the unexpected behavior is attributed to the control processing performed by the ECU. Additionally, the matching information transmission section transmits the matching information to the in-vehicle network. Then, when the second storage control section of the storage control device receives (acquires) the matching information, the second storage control section deletes or permits overwriting the unexpected behavior data stored in the memory section. In this case, "permit overwriting" means that the data is prohibited from being read and is permitted to be overwritten. Therefore, only the behavior data appropriate for analysis remains stored in the memory section in a readable state (an available state). It becomes possible to adequately analyze the unexpected behavior.

Moreover, at a time when the behavior determination section of the storage control device determines that the unexpected behavior has occurred, the unexpected behavior data indicating the unexpected behavior at that time is recorded. Therefore, it is possible to secure a latest behavior data.

Moreover, when the ECU compares the unexpected behavior data with the behavior estimated to occur due to the control processing performed by the ECU and determines that the unexpected behavior data matches the estimated behavior, the ECU 4 transmits the matching information. Therefore, as compared with a case where an ECU constantly transmits data, it is possible to reduce the congestion of communications on the in-vehicle network. Furthermore, since it is sufficient for this matching information to indicate the data matching, the matching information requires a remarkably small data amount (e.g., 1 bit). Because of this also, it is possible to further reduce the congestion of communications on the in-vehicle network. As a result, no trouble is brought to communications between other ECUs or communications between each behavior sensor and each ECU. Moreover, since a data amount of the matching information can be small, the matching information can be transmitted at a high transmission speed.

According to a second aspect of the present disclosure, a vehicle behavior data storage control system comprising a storage control device and an electronic control unit (ECU) can be configured as follows. The storage control device includes a behavior determination section, a first memory and a second memory. The behavior determination section acquires behavior data and determines whether or not an unexpected behavior has occurred based on the acquired behavior data. Each of the first memory and the second memory is provided to store the behavior data associated with the unexpected behavior as an unexpected behavior data. The electronic control unit (ECU) controls a predetermined control target and is connected to the storage control device via an in-vehicle network to enable data exchange with the storage control device. The storage control device further includes a first storage control section that records in the first memory the behavior data at a time when the behavior determination section determines that the unexpected behavior has occurred, so that the behavior data associated with the unexpected behavior is stored as the unexpected behavior data in the first memory. The storage control device further includes an unexpected behavior data transmission section that transmits the unexpected behavior data to the in-vehicle network. The ECU includes a behavior data comparison determination section that (i) calculates an estimated behavior data indicative of an estimated behavior, which is a behavior estimated to occur due to control processing performed by the ECU, and (ii) determines whether or not content of the unexpected behavior data, which is transmitted from the storage control device to the in-vehicle network, matches that of the estimated behavior data. When the content of the unexpected behavior data matches that of the estimated behavior data, the behavior data comparison determination section determines that occurrence of the unexpected behavior is attributed to the control processing performed by the ECU. The ECU further includes a matching information transmission section that transmits matching information to the in-vehicle network when the behavior data comparison determination section determines that the content of the unexpected behavior data matches that of the estimated behavior data. The storage control device further includes a second storage control section that, upon receipt of the matching information, records in the second memory the unexpected behavior data that was recorded in the first memory by the first storage control section.

According to the above configuration, in the second memory, only the unexpected behavior data is stored. Thus, a storage area of the second memory can be fully used for the unexpected behavior data adapted to be used in analysis. This configuration may be suitable to cases where the second memory has a small storage capacity. Specifically, taking cost into account and considering that there is much data to be stored, the second memory may have a limited storage capacity for the unexpected behavior data and an amount of data storable in the second memory may be limited also. In this case, if at least one behavior data not corresponding to the unexpected behavior attributed to the control processing of the ECU were stored in the second memory incapable of storing a large amount of data, the storage capacity for the unexpected behavior data adapted to be used in analysis would further decrease and data usage efficiency would be reduced. However, according to the above configuration of the vehicle behavior data storage control system, even if the second memory has a small storage capacity and the number of storable data is small, the unexpected behavior data can be fully stored and the data usage efficiency can be enhanced.

The above vehicle behavior data storage control system may be configured such that only when the ECU is in an operation state where the ECU controls the control target, the ECU accepts reception of the unexpected behavior data.

When the ECU is in the operation state, the cruise ECU 4 estimates the behavior that will occur due the control processing. The data of the estimated behavior is suitable information for the storage control device to make a determination as to whether or not the unexpected behavior data is to be stored. Thus, when the ECU is in the operation state, it is not wasteful for the behavior data comparison determination section to perform a data comparison operation. It should be noted that the ECU not in the operation state does not perform the control processing. Thus, when the ECU is not in the operation state, the data comparison operation of the behavior data comparison determination section may be wasteful because the determination as to whether or not the unexpected behavior data is stored cannot be made. The above configuration is made in view of this. Specifically, according to the above configuration, only when the ECU is in the operation state where the ECU controls the control target, the cruise ECU accepts reception of the unexpected behavior data. Thus, only when the ECU can calculate the estimated behavior data serving as the suitable information for the determination as to the unexpected behavior data, the ECU can accept reception of the unexpected behavior data and operate the behavior data comparison determination section and the matching information transmission section. Therefore, a result of determination by the behavior data comparison determination section 40 becomes precise. Additionally, wasted operations of the behavior data comparison determination section and the matching information transmission section when the cruise ECU is not in the operation state can be eliminated.

The above vehicle behavior data storage control system may be configured as follows. The unexpected behavior data includes time information. The ECU associates the estimated behavior data of the ECU with time information, the time information being common to the unexpected behavior data and the estimated behavior data. When the content of the unexpected behavior data including the time information matches that of the estimated behavior data associated with the time information common to the unexpected behavior data, the behavior data comparison determination section determines that the occurrence of the unexpected behavior is attributed to the control processing performed by the ECU.

According to the above configuration, in order to determine whether or not the occurrence of the unexpected behavior is attributed to the control processing performed by the ECU, it is determined not only whether or not the content of the unexpected behavior data matches that of the estimated behavior data of the ECU but also whether or not the time information of the unexpected behavior data matches that of the estimated behavior data of the ECU. Therefore, it is possible to accurately determine whether the unexpected behavior data indicates a true abnormal behavior. It is possible to make a precise determination as to whether or not the unexpected behavior data is be stored.

The above vehicle behavior data storage control system may be configured as follows. A destination of the unexpected behavior data, which is transmitted from the storage control device via the in-vehicle network, is limited to the ECU that relates to the storage control device. According to this configuration, an irrelevant certain ECU on the in-vehicle network is prevented from acquiring and processing the behavior data, which is irrelevant to the certain ECU.

The above vehicle behavior data storage control system may be configured as follows. The ECU recited in the above is a first ECU. The vehicle behavior data storage control system further comprises a second ECU. The first ECU, which includes the behavior data comparison determination section and the matching information transmission section, controls an actuator based on a behavior sensor data inputted from a behavior sensor. The second ECU is configured not to receive the behavior sensor data from the behavior sensor. The second ECU is further configured to perform data reception only from the first ECU via the in-vehicle network and issue a request to the first ECU. According to this configuration, since the first ECU, which directly controls the actuator, transmits, the matching information, it is possible to promptly provide the matching information to the storage control device.

The above vehicle behavior data storage control system may be configured as follows. The storage control device is equipped in an electronic control unit that is other than and different in type from the above recited ECU. According to this configuration, the different type electronic control unit can serves as the first storage control section, the unexpected behavior data transmission section and the second storage control section of the storage control device.

The above vehicle behavior data storage control system may be configured as follows. The first storage control section ranks the unexpected behavior data according to a degree of the unexpected behavior, and then records the ranked unexpected behavior data. According to this configuration, it is possible to reduce a stored data amount as compared with a case where the unexpected behavior data itself, i.e. its data value itself, is stored.

The above vehicle behavior data storage control system may be configured as follows. The behavior data comparison determination section ranks the estimated behavior data according to a degree of the estimated behavior, and then compares the ranked estimated behavior data with the unexpected behavior data. According to this configuration, since the estimated behavior data is ranked, a data amount of the estimated behavior data can be reduced. The estimated behavior data can be stored without occupying a large storage area of the ECU.

The above vehicle behavior data storage control system may be configured as follows. The unexpected behavior data transmission section ranks the unexpected behavior data according to a degree of the unexpected behavior, and then transmits the ranked unexpected behavior data to the in-vehicle network. According to this configuration, it is possible to reduce a network load as compared with a case where the unexpected behavior data itself, i.e. a data value, is transmitted to the network.

According to another aspect of the present disclosure, a subject electronic control unit connected with a network is provided. To the network, a storage device is also connected. The storage device acquires behavior data indicative of an actual vehicle behavior and determines whether or not an unexpected behavior has occurred based on the acquired behavior data. Upon determining that the unexpected behavior has occurred, the storage device records the behavior data as the unexpected behavior data and transmits the unexpected behavior data to the network. To network, a plurality of electronic control units is further connected in addition to the subject electronic control unit. The subject electronic control unit is configure to (i) perform control processing having an influence on the vehicle behavior, (ii) calculate an estimated behavior data-indicative of an estimated future behavior based on a control amount of the control processing performed by the subject electronic control unit, and (iii) output matching information when a difference between the estimated behavior data and the unexpected behavior data transmitted from the storage device to the network is less than or equal to a predetermined value. The matching information indicates that the unexpected behavior data is attributed to the control processing of the subject electronic control unit. According to this subject electronic control unit, it is possible to achieve substantially the same advantages as the above vehicle behavior data storage control system.

The above subject electronic control unit may be configured as follows. The subject electronic control unit calculates the estimated behavior data indicative of the estimated behavior at a plurality of different times, and compares the unexpected behavior data with the estimated behavior data indicative of the estimated behavior that corresponds to a time of occurrence of the unexpected behavior. According to the above configuration, by taking into account time information, it is possible to accurately determine whether the unexpected behavior data indicates a true abnormal behavior.

The above subject electronic control unit may be configured as follows. The subject electronic control unit ranks the estimated behavior data according to a degree of the estimated behavior and then compares the ranked estimated behavior data and the unexpected behavior data with each other. According to this configuration, since the estimated behavior data is ranked, a data amount of the estimated behavior data can be reduced. The estimated behavior data can be stored without occupying a large storage area of the ECU.

A large memory for storing the estimated behavior data may not be required.

While the present disclosure has been described with reference to exemplary embodiments thereof, it is to be understood that the disclosure is not limited to the exemplary embodiments and constructions. The present disclosure is intended to cover various modification and equivalent arrangements. In addition, while the various combinations and configurations, and other combinations and configurations, including more, less or only a single element, are also within the spirit and scope of the present disclosure.

What is claimed is:

1. A vehicle behavior data storage control system comprising:

a storage control device that includes a behavior determination section that acquires behavior data and determines whether or not an unexpected behavior has occurred based on the acquired behavior data, and a memory section for storing the behavior data associated with the unexpected behavior as an unexpected behavior data; and an electronic control unit (ECU) that controls a predetermined control target and is connected to the storage control device via an in-vehicle network to enable data exchange with the storage control device, wherein:

the storage control device further includes:

a first storage control section that records in the memory section the behavior data at a time when the behavior determination section determines that the unexpected behavior has occurred, so that the behavior data associated with the unexpected behavior is stored as the unexpected behavior data in the memory section; and an unexpected behavior data transmission section that transmits the unexpected behavior data to the in-vehicle network;

the ECU includes:

a behavior data comparison determination section that calculates an estimated behavior data indicative of an estimated behavior, which is a behavior estimated to occur due to control processing performed by the ECU, determines whether or not content of the unexpected behavior data, which is transmitted from the storage control device to the in-vehicle network, matches that of the estimated behavior data, and when the content of the unexpected behavior data matches that of the estimated behavior data, determines that occurrence of the unexpected behavior is attributed to the control processing performed by the ECU; and a matching information transmission section that transmits matching information to the in-vehicle network when the behavior data comparison determination section determines that the content of the unexpected behavior data matches that of the estimated behavior data; and the storage control device further includes a second storage control section that, upon receipt of the matching information, deletes or permits overwriting the unexpected behavior data stored in the memory section.

2. A vehicle behavior data storage control system, comprising:

a storage control device that includes a behavior determination section that acquires behavior data and determines whether or not an unexpected behavior has occurred based on the acquired behavior data, and a first memory and a second memory each for storing the behavior data associated with the unexpected behavior as an unexpected behavior data; and an electronic control unit (ECU) that controls a predetermined control target and is connected to the storage control device via an in-vehicle network to enable data exchange with the storage control device, wherein:

the storage control device further includes:

a first storage control section that records in the first memory the behavior data at a time when the behavior determination section determines that the unexpected behavior has occurred, so that the behavior data associated with the unexpected behavior is stored as the unexpected behavior data in the first memory; and an unexpected behavior data transmission section that transmits the unexpected behavior data to the in-vehicle network;

the ECU includes:

a behavior data comparison determination section that calculates an estimated behavior data indicative of an estimated behavior, which is a behavior estimated to occur due to control processing performed by the ECU, determines whether or not content of the unexpected behavior data, which is transmitted from the storage control device to the in-vehicle network, matches that of the estimated behavior data, and when the content of the unexpected behavior data matches that of the estimated behavior data, determines that occurrence of the unexpected behavior is attributed to the control processing performed by the ECU; and a matching information transmission section that transmits matching information to the in-vehicle network when the behavior data comparison determination section determines that the content of the unexpected behavior data matches that of the estimated behavior data; and the storage control device further includes a second storage control section that, in absence of receipt of the matching information, records in the second memory the unexpected behavior data that was recorded in the first memory by the first storage control section.

3. The vehicle behavior data storage control system according to claim 1, wherein:

only when the ECU is in an operation state where the ECU controls the control target, the ECU accepts reception of the unexpected behavior data.

4. The vehicle behavior data storage control system according to claim 1, wherein:

the unexpected behavior data includes time information;

the ECU associates the estimated behavior data of the ECU with time information, time information being common to the unexpected behavior data and the estimated behavior data; and when the content of the unexpected behavior data including the time information matches that of the estimated behavior data associated with the time information common to the unexpected behavior data, the behavior data comparison determination section determines that the occurrence of the unexpected behavior is attributed to the control processing performed by the ECU.

5. The vehicle behavior data storage control system according to claim 1, wherein:

a destination of the unexpected behavior data, which is transmitted from the storage control device via the in-vehicle network, is limited to an ECU that relates to the storage control device.

6. The vehicle behavior data storage control system according to claim 1, wherein the ECU recited in claim 1 is a first ECU, the vehicle behavior data storage control system further comprising:

a second ECU, wherein:

the first ECU, which includes the behavior data comparison determination section and the matching information transmission section, controls an actuator based on a behavior sensor data inputted from a behavior sensor;

the second ECU is configured not to receive the behavior sensor data from the behavior sensor; and the second ECU is further configured to perform data reception only from the first ECU via the in-vehicle network and issue a request to the first ECU.

7. The vehicle behavior data storage control system according to claim 1, wherein:

the storage control device is equipped in an electronic control unit that is other than the ECU recited in claim 1.

8. The vehicle behavior data storage control system according to claim 1, wherein:

the first storage control section ranks the unexpected behavior data according to a degree of the unexpected behavior, and then records the ranked unexpected behavior data.

9. The vehicle behavior data storage control system according to claim 1, wherein:

the unexpected behavior data transmission section ranks the unexpected behavior data according to a degree of the unexpected behavior, and then transmits the ranked unexpected behavior data to the in-vehicle network.

10. The vehicle behavior data storage control system according to claim 1, wherein:

the behavior data comparison determination section ranks the estimated behavior data according to a degree of the estimated behavior, and then compares the ranked estimated behavior data with the unexpected behavior data.

11. A subject electronic control unit connected with a network, wherein a storage device is connected with the network, wherein the storage device acquires behavior data indicative of actual vehicle behavior and determines based on the acquired behavior data whether or not an unexpected behavior has occurred, wherein upon determining that the unexpected behavior has occurred, the storage device records the behavior data as the unexpected behavior data and transmits the unexpected behavior data to the network, wherein in addition to the subject electronic control unit, a plurality of other electronic control units is connected with the network, the subject electronic control unit comprising:

a microcomputer that performs control processing having an influence on the vehicle behavior, calculates an estimated behavior data indicative of an estimated future behavior based on a control amount of the control processing performed by the subject electronic control unit, and outputs matching information when a difference between the estimated behavior data and the unexpected behavior data transmitted from the storage device to the network is less than or equal to a predetermined value, wherein the matching information indicates that the unexpected behavior data is attributed to the control processing of the subject electronic control unit.

12. The subject electronic control unit according to claim 11, wherein:

the microcomputer calculates the estimated behavior data indicative of the estimated behavior at a plurality of different times, and compares the unexpected behavior data with the estimated behavior data indicative of the estimated behavior that corresponds to a time of occurrence of the unexpected behavior.

13. The subject electronic control unit according to claim 11, wherein:

the microcomputer ranks the estimated behavior data according to a degree of the estimated behavior and then compare the ranked estimated behavior data and the unexpected behavior data with each other.

14. The vehicle behavior data storage control system according to claim 2, wherein:

only when the ECU is in an operation state where the ECU controls the control target, the ECU accepts reception of the unexpected behavior data.

15. The vehicle behavior data storage control system according to claim 2, wherein:

the unexpected behavior data includes time information;

the ECU associates the estimated behavior data of the ECU with time information, the time information being common to the unexpected behavior data and the estimated behavior data; and when the content of the unexpected behavior data including the time information matches that of the estimated behavior data associated with the time information common to the unexpected behavior data, the behavior data comparison determination section determines that the occurrence of the unexpected behavior is attributed to the control processing performed by the ECU.

16. The vehicle behavior data storage control system according to claim 2, wherein:

a destination of the unexpected behavior data, which is transmitted from the storage control device via the in-vehicle network, is limited to an ECU that relates to the storage control device.

17. The vehicle behavior data storage control system according to claim 2, wherein the ECU recited in claim 1 is a first ECU, the vehicle behavior data storage control system further comprising:

a second ECU, wherein:

the first ECU, which includes the behavior data comparison determination section and the matching information transmission section, controls an actuator based on a behavior sensor data inputted from a behavior sensor;

the second ECU is configured not to receive the behavior sensor data from the behavior sensor; and the second ECU is further configured to perform data reception only from the first ECU via the in-vehicle network and issue a request to the first ECU.

18. The vehicle behavior data storage control system according to claim 2, wherein:

the storage control device is equipped in an electronic control unit that is other than the ECU recited in claim 1.

19. The vehicle behavior data storage control system according to claim 2, wherein:

the first storage control section ranks the unexpected behavior data according to a degree of the unexpected behavior, and then records the ranked unexpected behavior data.

20. The vehicle behavior data storage control system according to claim 2, wherein:

the unexpected behavior data transmission section ranks the unexpected behavior data according to a degree of the unexpected behavior, and then transmits the ranked unexpected behavior data to the in-vehicle network.

21. The vehicle behavior data storage control system according to claim 2, wherein:

the behavior data comparison determination section ranks the estimated behavior data according to a degree of the estimated behavior, and then compares the ranked estimated behavior data with the unexpected behavior data.

22. The vehicle behavior data storage control system according to claim 2, wherein:

when the second storage control section has not received the matching information until a predetermined time has elapsed since the unexpected behavior data was recorded in the first memory, the second storage control section records in the second memory the unexpected behavior data that was recorded in the first memory by the first storage control section.

* * * * *